(12) United States Patent
Patton

(10) Patent No.: US 8,078,235 B2
(45) Date of Patent: *Dec. 13, 2011

(54) TELEPHONE SIGNAL GENERATOR AND METHODS AND DEVICES USING THE SAME

(76) Inventor: John D. Patton, Seattle, WA (US)

( * ) Notice: Subject to any disclaimer, the term of this patent is extended or adjusted under 35 U.S.C. 154(b) by 851 days.

This patent is subject to a terminal disclaimer.

(21) Appl. No.: 12/061,585

(22) Filed: Apr. 2, 2008

(65) Prior Publication Data

US 2008/0181376 A1 Jul. 31, 2008

Related U.S. Application Data

(62) Division of application No. 10/917,627, filed on Aug. 13, 2004, now Pat. No. 7,366,295.

(60) Provisional application No. 60/495,299, filed on Aug. 14, 2003.

(51) Int. Cl.
*H04M 1/00* (2006.01)

(52) U.S. Cl. ............. 455/575.1; 379/375.01; 348/14.01

(58) Field of Classification Search ............... 348/14.01; 455/575.1; 379/375.01
See application file for complete search history.

(56) References Cited

U.S. PATENT DOCUMENTS

| | | | |
|---|---|---|---|
| 4,509,190 A | 4/1985 | Spector | |
| 4,586,905 A | 5/1986 | Groff | |
| 5,633,993 A | 5/1997 | Redmann et al. | |
| 5,708,724 A | 1/1998 | Burris et al. | |
| 5,721,783 A | 2/1998 | Anderson | |
| 5,765,134 A | 6/1998 | Kehoe | |
| 5,767,835 A | 6/1998 | Obbink et al. | |
| 5,903,628 A | 5/1999 | Brennan et al. | |
| 5,913,163 A | 6/1999 | Johansson et al. | |
| 6,034,746 A | 3/2000 | Desai et al. | |
| 6,148,175 A | 11/2000 | Freedland | |
| 6,188,769 B1 | 2/2001 | Jot et al. | |
| 6,224,386 B1 | 5/2001 | Suzuki | |
| 6,328,570 B1 | 12/2001 | Ng | |
| 6,363,139 B1 | 3/2002 | Zurek et al. | |
| 6,407,325 B2 | 6/2002 | Yi et al. | |
| 6,473,114 B1 | 10/2002 | Strubbe | |
| 6,510,325 B1 | 1/2003 | Mack, II et al. | |
| 6,611,592 B1 | 8/2003 | Sato et al. | |
| 6,683,938 B1 | 1/2004 | Henderson | |
| 6,763,226 B1 | 7/2004 | McZeal, Jr. | |
| 6,856,817 B2 | 2/2005 | Tischler et al. | |
| 6,922,473 B2 | 7/2005 | Turnbull | |
| 6,963,839 B1 | 11/2005 | Ostermann et al. | |

(Continued)

FOREIGN PATENT DOCUMENTS

JP 200099066 4/2000

(Continued)

OTHER PUBLICATIONS

"GN 6110 User Guide," GN Netcom, Inc., Nov. 20, 2003, 18 pages.

(Continued)

*Primary Examiner* — Alexander Jamal
(74) *Attorney, Agent, or Firm* — Frommer Lawrence & Haug LLP; John W. Branch

(57) ABSTRACT

A method or device includes a telephone with an audio or video effects generator to produce audio or video effects that are transmitted as part of a signal from the telephone.

20 Claims, 3 Drawing Sheets

U.S. PATENT DOCUMENTS

| | | |
|---|---|---|
| 6,999,920 B1 | 2/2006 | Matt et al. |
| 7,006,976 B2 | 2/2006 | Glatt |
| 7,039,194 B1 | 5/2006 | Kemp et al. |
| 7,065,219 B1 | 6/2006 | Abe et al. |
| 7,089,042 B2 | 8/2006 | Bodley |
| 7,110,799 B1 | 9/2006 | Willins et al. |
| 7,123,715 B2 | 10/2006 | Leung |
| 7,136,684 B2 | 11/2006 | Matsuura et al. |
| 7,149,552 B2 | 12/2006 | Lair |
| 7,251,507 B2 | 7/2007 | Kitao et al. |
| 7,262,358 B2 | 8/2007 | Lubbers |
| 7,272,561 B2 | 9/2007 | Miyazaki et al. |
| 7,599,719 B2 * | 10/2009 | Patton ............... 455/575.1 |
| 2001/0034255 A1 | 10/2001 | Hayama et al. |
| 2001/0043784 A1 | 11/2001 | Shirata et al. |
| 2002/0110224 A1 | 8/2002 | Kovales et al. |
| 2002/0110248 A1 | 8/2002 | Kovales et al. |
| 2002/0115479 A1 | 8/2002 | Tischler |
| 2002/0118848 A1 | 8/2002 | Karpenstein |
| 2002/0151329 A1 | 10/2002 | Prince et al. |
| 2003/0014246 A1 | 1/2003 | Choi |
| 2003/0091204 A1 | 5/2003 | Gibson |
| 2003/0099459 A1 * | 5/2003 | Yanagita et al. ............ 386/52 |
| 2003/0107478 A1 | 6/2003 | Hendricks et al. |
| 2003/0138080 A1 | 7/2003 | Nelson et al. |
| 2003/0165243 A1 | 9/2003 | Liu |
| 2003/0195749 A1 | 10/2003 | Schuller |
| 2003/0223602 A1 | 12/2003 | Eichler et al. |
| 2004/0007120 A1 | 1/2004 | Futamase et al. |
| 2004/0010464 A1 | 1/2004 | Boaz |
| 2004/0012613 A1 * | 1/2004 | Rast ............................ 345/632 |
| 2004/0014459 A1 | 1/2004 | Shanahan |
| 2004/0022371 A1 | 2/2004 | Kovales et al. |
| 2004/0029086 A1 | 2/2004 | Burg et al. |
| 2004/0058674 A1 | 3/2004 | Yoakum |
| 2004/0063475 A1 | 4/2004 | Weng |
| 2004/0147282 A1 | 7/2004 | Nakasato et al. |
| 2004/0156616 A1 | 8/2004 | Strub et al. |
| 2005/0026568 A1 | 2/2005 | Hawker et al. |
| 2005/0037742 A1 | 2/2005 | Patton |
| 2005/0075169 A1 | 4/2005 | Cheng et al. |
| 2005/0129259 A1 | 6/2005 | Garner |
| 2005/0136839 A1 | 6/2005 | Seshadri et al. |
| 2005/0141680 A1 | 6/2005 | Tucker et al. |
| 2005/0153748 A1 | 7/2005 | Bodley |
| 2005/0190298 A1 | 9/2005 | Kurashige |
| 2005/0231642 A1 | 10/2005 | Roman et al. |
| 2005/0232445 A1 | 10/2005 | Vaudrey et al. |
| 2005/0260953 A1 | 11/2005 | Lefler et al. |
| 2005/0271218 A1 | 12/2005 | Peng |
| 2005/0272477 A1 | 12/2005 | Boykins et al. |
| 2006/0050890 A1 | 3/2006 | Tsuhako |
| 2006/0075439 A1 | 4/2006 | Vance |
| 2006/0084504 A1 | 4/2006 | Chan et al. |
| 2006/0087941 A1 | 4/2006 | Obradovich |
| 2006/0116073 A1 | 6/2006 | Richenstein et al. |
| 2006/0229108 A1 | 10/2006 | Cehelnik |
| 2006/0287014 A1 | 12/2006 | Matsuura et al. |
| 2007/0004464 A1 | 1/2007 | Lair et al. |
| 2007/0010288 A1 | 1/2007 | Willins et al. |
| 2007/0123207 A1 | 5/2007 | Terlizzi |
| 2007/0178944 A1 | 8/2007 | Mitsuru et al. |
| 2007/0270184 A1 | 11/2007 | Hurula et al. |

FOREIGN PATENT DOCUMENTS

| | | | |
|---|---|---|---|
| WO | WO-01/28221 A1 | 4/2001 | |

OTHER PUBLICATIONS

Morris, Becky, "Beyond Hearing Aids," Newsletter, Dec. 2004, www.beyondhearings.com, 2 pages.

Ogasawara, Todd, "The Motorola MPx200 Smartphone 2002," O'Reilly Wireless DevCenter, Jan. 30, 2004, 11 pages.

* cited by examiner

US 8,078,235 B2

TELEPHONE SIGNAL GENERATOR AND METHODS AND DEVICES USING THE SAME

RELATED APPLICATIONS

This application is a divisional of U.S. patent application Ser. No. 10/917,627, filed Aug. 13, 2004, which claims the benefit of U.S. Provisional Application Ser. No. 60/495,299, filed Aug. 14, 2003, both of which are incorporated herein by reference.

FIELD

The present inventions are directed to the area of telephones, including mobile telephones, and methods and devices using telephones. The present inventions are also directed to the area of audio and visual effects generators for use with telephones, including mobile telephones, and methods and device using such generators and telephones.

BACKGROUND

Telephones, particularly mobile telephones, are becoming increasingly important in the lives of many people. The use of mobile telephones has grown dramatically and these devices are now a fixture in our society. It is now common to see people walking down the street, riding a bus, or having a meal while talking on a telephone. These devices can allow people to conduct their personal and professional business in a more efficient manner because they can communicate directly with others and receive immediate feedback. Mobile telephones allow people to convey desired information to others.

The telephone has also changed over time. Now telephones can be separate devices or they can include other devices, such as a personal desk assistant (PDA), a to-point connection, but the telephone signal can be divided into separate packets and transmitted to the other telephone over wired or wireless (or combinations of wired and wireless) networks.

The increased accessibility associated with mobile telephones can have great advantages, but it can also be inefficient, disruptive, or distracting when unwanted phone calls are received or a caller lingers on the line too long. It can be difficult to find a socially acceptable method to end or postpone the call.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present inventions are directed to the area of telephones, including mobile telephones, and methods and devices using telephones. The present inventions are also directed to the area of audio and visual effects generators for use with telephones, including mobile telephones, and methods and device using such generators and telephones. The inventions can be realized using hardware, software, or combinations thereof.

A telephone includes an audio or visual effects generator (or both) that can alter audio signals or items of visual information that are transmitted over the telephone. For example, an audio effects generator can add sounds, modify sounds, intermittently halt the audio signal, or otherwise alter the audio signal transmitted by the telephone. A visual effects generator can alter, for example, the background or foreground of images or video transmitted over the telephone.

Figure 1:
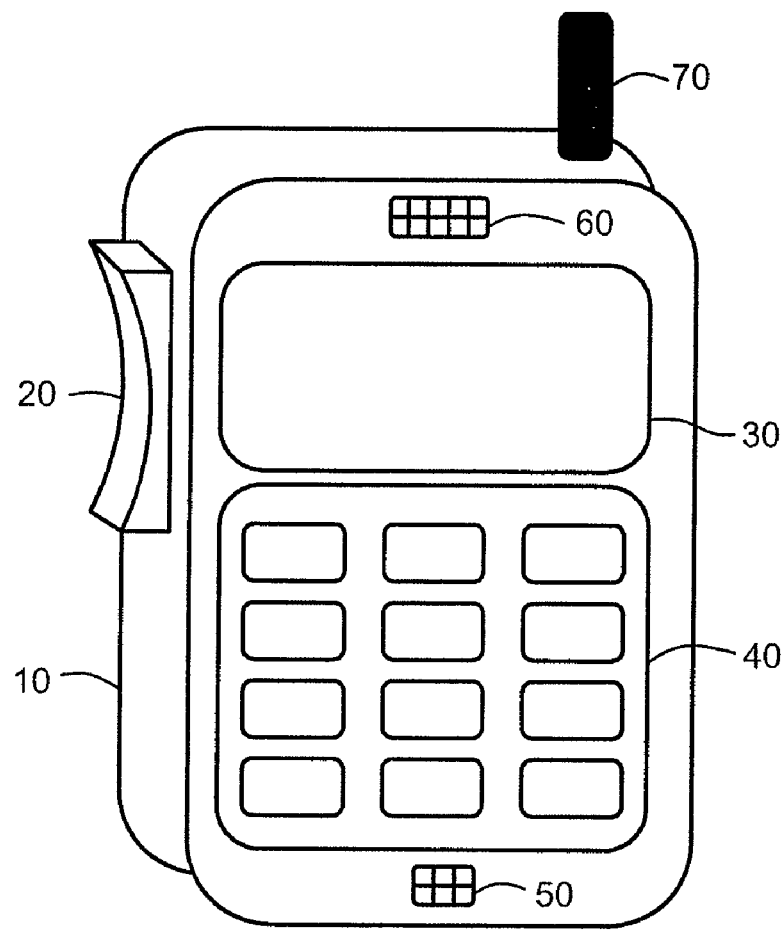
FIG. 1 is a schematic perspective view of a telephone.

FIG. 1 schematically illustrates one example of a telephone. The telephone includes a telephone body 10, one or more buttons 20, a screen 30, a keypad 40, a microphone 50, a speaker 60, and an antenna 70. The telephone can also include other components such as, for example, a camera, a video camera, a cover, a headset, an i/o (input/output) port (for example, a serial, USB, IR, or RF port), removable memory devices, and the like.

Although the illustrated telephone is a mobile phone, it will be understood that other telephones can be used including, for example, cordless telephones and corded telephones (in which case the antenna 70 is replaced with a cord attached to a base unit or a telephone line.) Telephones include devices such as cellular telephones, internet phones, and smart phones, as well as personal desk assistants (PDA's) and other mobile devices that have audio or visual messaging capabilities.

The telephone can communicate using analog or digital signals over wired, wireless, or combinations of wired and wireless networks. The audio signal or visual information from the telephone can be a continuous or intermittent point-to-point transmission between telephones or the audio signal or visual information can be transmitted as one or more separate packets of data sent from one telephone and reassembled by the other telephone. The packets of data can be transmitted on wired or wireless networks or combinations thereof. The packets of data may follow the same path or they may be conveyed over different paths. Any method of transmitting and receiving the packets of data can be used to convey the audio signal/visual information including methods utilizing communication protocols such as, for example, global system for mobile communications (GSM), code division multiple access (CDMA), Institute for Electrical and Electronics Engineers (IEEE) 802.11, IEEE 802.16 (WiMax), user datagram protocol (UDP), transmission control protocol/Internet protocol (TCP/IP), SMS, general packet radio service (GPRS), Wireless Application Protocol (WAP), voice over internet protocol (VOIP), and the like.

The telephone body 10 can have any shape, size, and color. The screen 30 can be any type of display screen including, but not limited to, a black and white or color LCD screen. Generally, mobile phones have a screen, but other phones such as, cordless and corded phones, may or may not have a screen.

The microphone 50 receives sound from the user. This sound is then converted into an audio signal and sent to another telephone. The speaker 60 produces sounds for the user based on the audio signal from both the user's telephone and the other telephone. In addition to audio signals, information, such as pictures or videos, can also be transmitted by the telephone. The antenna 70 allows the reception and transmission of audio signals or other information. As indicated above, the antenna can be replaced by a cord for reception and transmission of audio signals.

The keypad 40 allows the user to input information, such as telephone numbers, contact names, etc., into the telephone. Other input information and commands can be provided to the telephone by the keypad 40. The telephone can also include other buttons, switches, and the like, such as button 20, to provide additional input to the telephone. Such input can be, for example, scrolling through a menu using buttons or keys, selecting items on the menu, activating or deactivating the telephone, increasing or decreasing the volume of the speaker, increasing or decreasing the volume of a ring tone, accessing messages, and the like.

Figure 2:
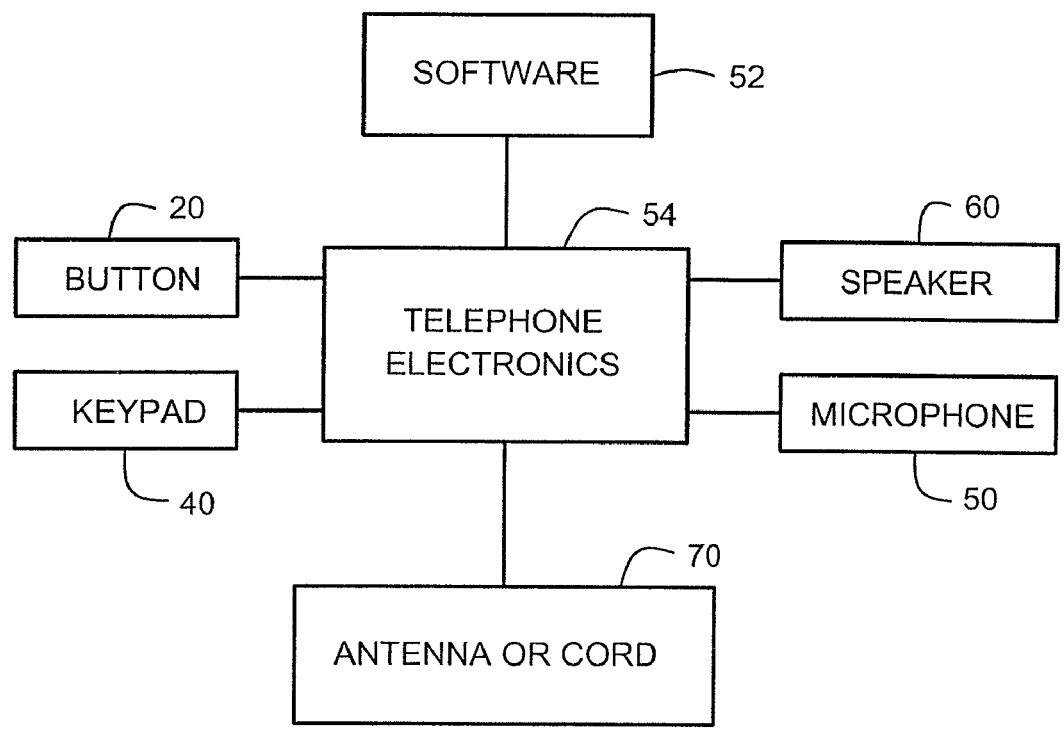
FIG. 2 is a schematic drawing of components of one embodiment of a telephone, according to the inventions.
Figure 3:
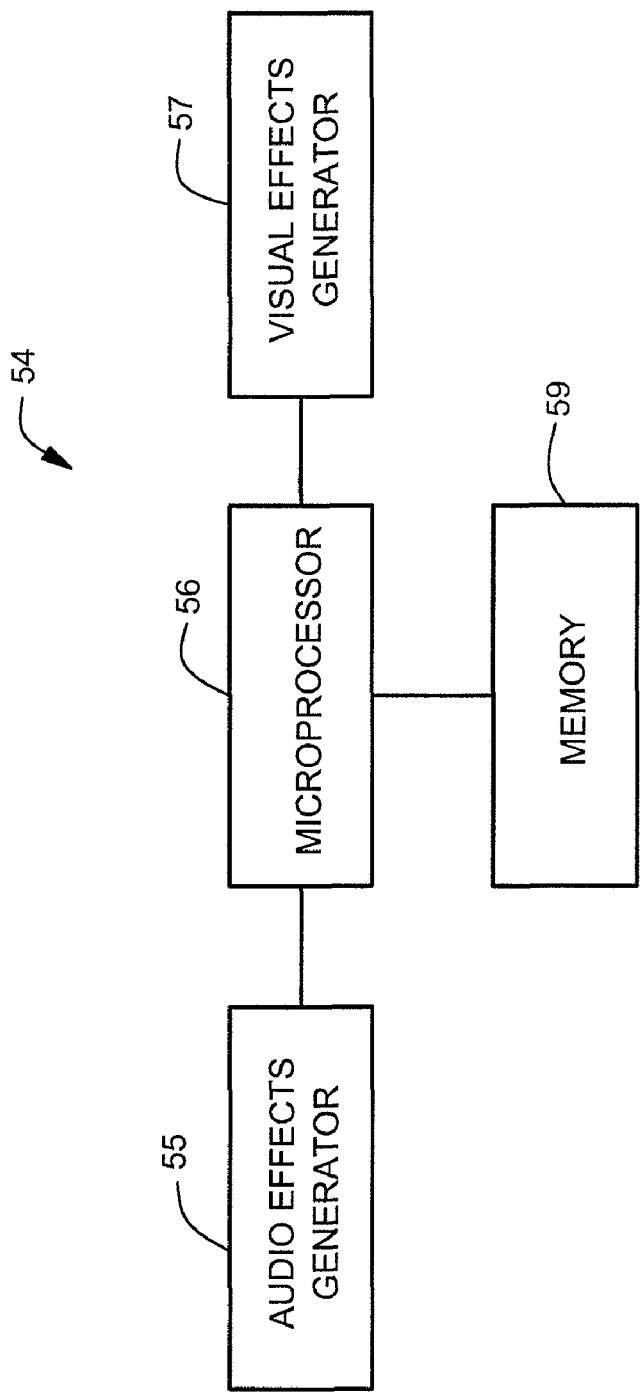
FIG. 3 is a schematic drawing of control and effects components of one embodiment of a telephone, according to the inventions.

FIG. 2 is a schematic illustration of components of the telephone including the button 20, keypad 40, microphone 50, speaker 60, antenna/cord 70 which are all coupled to the telephone electronics 54. The telephone electronics 54 typically includes a microprocessor 56, an audio effects generator 55 or visual effects generator 57 (or both), memory 59, and other electronic circuitry that control the operation of the telephone, as illustrated schematically in FIG. 3.

The operation of the telephone can be managed by software 52 that operates with the microprocessor and other electronics to control the telephone. Alternatively or additionally, the operation of the telephone or a portion of the operation of the telephone can be performed using hardware in place of software.

The software 52 can be permanently stored in the memory 59, or can be removable or modifiable, or some components of the software are permanent and some are removable or modifiable. As telephones become more sophisticated and flexible, the software generally does as well. At least some mobile telephones use a flexible operating system, such as the Symbian™ operating system, that allows the telephone to utilize a variety of programming that can be downloaded or otherwise supplied to the telephone. This gives the user flexibility in selecting telephone features, applications, games, dial tones, ring tones, music, display images, and the like.

Any type of memory 59 can be used including, for example, RAM, ROM, EEPROM, flash memory, or other memory technology. The memory can be used to store the software and other information, such as telephone numbers, contact lists, audio or video files, and the like.

The audio or visual effects generator can be implemented using hardware, software, or both. The audio or visual effects generator can be built into the telephone or can be added to the telephone by, for example, loading software onto the telephone, adding hardware into the telephone, attaching a retrofit unit to the telephone, or any combination thereof. For example, the audio or visual effects generator can include software stored in memory in the telephone, a mechanical device disposed in or attached to the telephone, an electronic circuit disposed in or attached to the telephone, or any combination thereof.

An audio or visual effect can be activated by, for example, pushing one or more of the buttons 20, pushing a key or a combination of keys on the keypad 40, pushing a combination of key(s) and button(s), or selecting the effect from a menu shown on display 30. For example, the user may push button 20 or push the "1" key three times to activate an audio effect. There may be more than one method to activate an audio or visual effect. For example, the effect can be activated by actuating button(s)/key(s) and by selecting a menu entry. Typically, each audio or visual effect will be activated differently by, for example, a different key/button or combination of button(s)/key(s) or a different menu choice. In some embodiments, the user can select which button/key or combination of buttons/keys activates the audio or visual effect. In some embodiments and for some or all of the audio and visual effects, characteristics of the audio or visual effect, such as length, volume, pitch, number, color, brightness, and the like, can be selected by, for example, a button/key or combination of buttons/keys, the length of time that the button or key or combination is pushed, selection from a menu, or by stored values that were previously selected by the user or default values initially set on the telephone.

The audio effects generator of the telephone can produce one or more of the audio effects described below. The audio effects generator alters the audio signal to produce the effect. The audio effects generator can, for example, add sounds to the audio signal, modify sounds in the audio signal, intermittently disrupt the audio signal to create gaps, and the like. The audio effects generator can achieve these effects using any method know to those of skill in the art including, but not limited to, altering the electronics in the telephone by adding or deleting analog, digital or rf components; changing characteristics of the analog, digital, or rf electronics; creating shorts in the telephone circuitry; altering characteristics of the digital or analog signal transmitted by the telephone; or creating sounds that are picked up by the microphone 50. The audio effects are typically heard by the user, but, in some embodiments, the audio effects are not heard by user but are transmitted to the other telephone. In some embodiments, the user and person on the other telephone will hear different effects.

In some embodiments, the audio or visual effect is performed using software or a combination of software and hardware. The software can be provided with the telephone or, in some embodiments, downloaded or otherwise supplied to the telephone. Downloaded software can be provided by a software provider free, for a fee, or free for a limited period of time at which time the software deactivates unless the user pays a fee or performs other acts, such as registration, required by the software provider to continue use of or reactivate the software.

One type of audio effect simulates notification of an incoming call on a separate line. Users with multiple-line telephones or with call waiting features are typically alerted to incoming calls by audio notification. This notification can be in the form of beeps or clicks. These audio alerts are also often signaled to the person on the other side of the line by beeps, clicks, or brief gaps in the audio signal. These distinctive audio effects alert the other person to the fact that the user has an incoming call and may want to postpone or end the current call. The ability for a user to create these distinctive audio effects on demand and thus provide evidence for an incoming call allows a user to excuse himself or herself from the original conversation in a manner that is generally socially acceptable.

To achieve this audio effect, the audio effects generator produces audible clicks, beeps, or gaps when the user activates the audio effect. The audio effect is typically heard through the speaker 60 and transmitted to the other telephone or cord 70. The audio effect generator may also allow the user to create a longer gap in the audio connection to simulate the user speaking with a person on the other line. This could also be simulated using a telephone's "hold" function. This audio effect can be particularly useful with callers that are lingering on the line or callers with whom the user does not wish to continue conversing, such as telemarketers.

Another optical effect simulates a poor quality connection between the user and the other telephone. Partially intelligible, unintelligible, and dropped wireless phone connections are a common and often irritating problem with wireless phone systems. Many patents and many millions of dollars have been devoted to improving the reliability and quality of wireless telephone calls. However, when a telephone user does not want to continue a phone conversation, having a poor quality telephone connection can actually benefit the user in that a poor quality connection provides the user with a socially acceptable reason to end or postpone a telephone call.

This audio effect can be used to simulate poor connections or degradation in the connection for analog or digital mobile phones, as well as cordless and corded phones. Moreover, a corded phone (or any other telephone) user may also simulate poor mobile phone connections when the user knows that the other party is on a mobile phone.

The audio effect can simulate, for example, gaps in transmission or interference (for example, static, high pitched sounds, fading or other changes in sound volume, garbled language, or intermittent gaps or periods of silence.) Optionally, the length or severity (e.g., number of gaps, volume of interference, or frequency of interference) of the optical effect can be controlled. For example, the user may select only a brief interruption in the audio signal or intermittent interruption over a random schedule, such as random gaps in transmission of the audio signal. In some embodiments, the optical effect generator allows the user the option to automatically or manually terminate the call as a result of the "poor connection". As one example, a short press of button 20 may only briefly interrupt the audio signal to and from the speaker 60 and microphone 50, while a long continuous press of button 20 may cause the audio signal to be intermittently interrupted on a random schedule and the call in progress ultimately terminated.

Another audio effect alters the voice of the user. Alterations include, but are not limited to, changing the pitch of the voice higher or lower, simulating an echo chamber, masking a voice, and changing the voice to a different sound such as a more electronic, musical, or robotic sound. More sophisticated alterations include simulating accents or the voices of others, such as famous individuals. Such alterations may include altering pitch of the voice in a variable manner, altering sounds (particularly vowel sounds), and changing cadence of the voice.

Another audio effect translates the words of the user. This can be accomplished using any methods known to those of skill in the art. For example, in one method, the audio effects generator includes voice recognition software or hardware so that the audio effects generator is able to recognize the words spoken by the user and then those words can be translated using translating software or hardware. The translated words can then be spoken using a library of previously recorded words or using speech simulation software or hardware. Alternatively or additionally, the words spoken on the other telephone can be translated by the user. Selection of the language for translation can be automatic or manual.

Yet another audio effect includes introducing background sound effects. Examples of such sound effects include office sounds, traffic sounds, airport sounds, street sounds, outdoor sounds, wilderness sounds, ocean or lake sounds, sports or sporting event sounds, gunfight, screaming, orgasm (his or hers), stadium sounds, auction sounds, circus or carnival sounds, maritime sounds (waves, birds, foghorns), canned laughs, quotes from famous people (George Bush, movie stars, etc.), and horse race sounds. Other possible background sound effects include the voices of others. For example, a background sound could be a voice asking for the user or a voice of a specific person to simulate the presence of that person in the vicinity of the user. These background sounds can be added to the audio signal by the audio effects generator. The background sound effects can be for the duration of the call, for a portion of the call, or momentary. Optionally, the user can turn the background sound effects on and off during the call. The background sound effects may be different for the user and the other telephone or the user may not hear any of the background sound effects that are sent to the other telephone. The user may also be able to select other characteristics of the sound effects, such as volume or pitch.

In some embodiments, the selection of a background sound effect (or any other audio or visual effect) and, optionally, the setting for characteristics of the effect can be associated with a particular party that the user is calling so that the effect is automatically activated when that party is called. The user can manually alter, adjust, or cancel the effect. The user can also reprogram which effect is associated with the party.

These background sound effects, or any other sound effects, can be recorded and stored for use by the audio effects generator or the sound effects can be generated by the audio effects generator. The telephone optionally allows the user to record background sound effects including environmental sounds (e.g., traffic, wilderness, airport, and ocean sounds, as well as others described above). The ability to record sounds is particularly useful when the user is recording in a place that has a unique or distinguishable sound environment. Alternatively or additionally, the telephone allows the user to obtain background sound effects from the Internet or from other sources. Optionally, the telephone will loop the recorded background sound effect so that once the effect ends it will immediately start again.

A visual effects generator can be used to modify visual information sent over the telephone. Visual information includes, but is not limited to, pictures, animations, cartoons, videos and video clips, icons, paintings, drawings, and the like. Many mobile telephones, as well as other telephones, have cameras that allow users to take pictures or produce video. Such cameras can allow the user to share pictures or video taken by the user with someone on the telephone line or to allow the other person on the line to see the user. The visual effects generator allows the user to modify elements of the background or foreground (or both) of the visual information. The visual effects generator can achieve these effects using any method known to those of skill in the art including, but not limited to, replacing a foreground or background image with a previously obtained image or a computer-generated image; and altering a characteristic of a foreground or background image such as, for example, color, shade, texture, shape, position, orientation, motion, brightness, focus, or contrast. The visual effects generator typically manipulates the signal transmitted by the telephone to alter the visual information sent to the other telephone in order to achieve the desired effect. Such alterations can include altering an image file before or during transmission of the file to the other telephone.

As one visual effect, the background of a picture, video, or other visual information is altered. In one embodiment, a foreground image is determined, the background or a portion of the background is then removed, and a new background replaces the old. The new background can be a previously recorded background; a background obtained from another source, such as the Internet or a service provider; or a computer-generated background. The new background can be anything including, but not limited to, actual places or scenes; realistic, fanciful, or imagined images; paintings or photographs; famous people or locations; solid, patterned, random, or other graphics; and the like.

In some embodiments, various aspects of the background or objects in the background is manipulated such as, for example, lighting direction or brightness, color, shade, contrast, texture, shapes of an object, motion of an object, position of an object, and orientation of an object. In some embodiments, the background is not replaced but only one or more of these aspects of the background or objects in the background is altered. Altering or changing the background can be useful, for example, to disguise where a user is currently located, to imply that a user is in a different place, for individual or social amusement or subterfuge.

In another visual effect, the foreground (for example, a person in the foreground) of a picture, video, or other visual information is altered. In one embodiment, the foreground image is determined and then removed or altered and replaced by a new foreground image. As an example, a user may alter his or her image to present different characteristics or a different appearance or to emphasize or deemphasize certain characteristics. As another example, the current appearance of the user may not be acceptable to the user (for example, the user may have just woken up or may be dirty from working outside) and the user may wish to show himself or herself in better clothes or with his or her hair styled or washed up, etc. In other embodiments, the user may wish to appear as another person or object or as a caricature or animated character. Other alterations include changes in lighting, color (including color of clothing), orientation, motion, position, brightness, and texture. It will also be recognized that foreground images other than an image of the user can be replaced or altered. Alterations can be made that are, should be, or may be apparent to the receiving party. In some embodiments, the alterations are made so that the alteration is or is believed to be undetectable by the receiving party.

The audio and visual effects generators allow a user to control elements of information sent to the other telephone. This permits the user to direct the awareness of the other party in ways that the user wishes. Alteration of the audio signal/graphics files can be useful to the user in communicating with others. Alteration of the audio signal/graphics files can also be done for amusement and other purposes.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A device, comprising:
a telephone configured and arranged to transmit an audio signal;
a visual effects generator coupled to the telephone and configured and arranged to produce at least one user-initiated visual effect altering visual information transmitted by the telephone; and
an audio effects generator coupled to the telephone and configured and arranged to produce at least one user-initiated audio effect that is transmitted as part of the audio signal, wherein the at least one audio effect provides a user with a socially acceptable reason to terminate a current telephone call.

2. The device of claim 1, wherein the visual effects generator is configured and arranged to alter a picture transmitted by the telephone.

3. The device of claim 1, wherein the visual effects generator is configured and arranged to alter video transmitted by the telephone.

4. The device of claim 1, wherein the visual effects generator is configured and arranged to alter a foreground of the visual information.

5. The device of claim 1, wherein the visual effects generator is configured and arranged to alter a background of the visual information.

6. The device of claim 1, wherein the visual effects generator is configured and arranged to replace a foreground or background image of the visual information with a previously obtained image.

7. The device of claim 1, wherein the visual effects generator is configured and arranged to replace a foreground or background image of the visual information with a computer generated image.

8. The device of claim 5, wherein the visual effects generator is configured and arranged to alter at least one feature of a background of the visual information, wherein the at least one feature is selected from lighting direction, lighting brightness, color, shade, contrast, texture, shapes of an object, motion of an object, position of an object, and orientation of an object.

9. The device of claim 5, wherein the visual effects generator is configured and arranged to replace a background image by an image of another place.

10. The device of claim 5, wherein the visual effects generator is configured and arranged to replace a background image by an image from a painting.

11. The device of claim 5, wherein the visual effects generator is configured and arranged to replace a background image by an image from a photograph.

12. The device of claim 4, wherein the visual effects generator is configured and arranged to alter at least one feature of a foreground of the visual information, wherein the at least one feature is selected from color, shade, texture, shape, position, orientation, motion, brightness, focus, and contrast.

13. The device of claim 1, wherein the telephone is a wireless telephone.

14. The device of claim 1, further comprising an audio effects generator coupled to the telephone and configured and arranged to produce at least one user-initiated audio effect that is transmitted as part of the audio signal.

15. The device of claim 1, wherein the video effects generator comprises software residing in the telephone.

16. The device of claim 1, wherein the video effects generator is disposed in the telephone.

17. A method of using a telephone, the method comprising:
transmitting an audio signal using the telephone;
activating a video effects generator coupled to the telephone to produce at least one user-initiated visual effect altering visual information transmitted by the telephone; and
an audio effects generator coupled to the telephone and configured and arranged to produce at least one user-initiated audio effect that is transmitted as part of the audio signal, wherein the at least one audio effect provides a user with a socially acceptable reason to terminate a current telephone call.

18. The method of claim 17, wherein activating a video effects generator comprises actuating one or more buttons or keys on the telephone to activate the video effects generator.

19. The method of claim 18, further comprising actuating one or more buttons or keys on the telephone to modify a characteristic of the user-initiated video effect.

20. The method of claim 17, wherein activating the user-initiated visual effect comprises altering a foreground or background of the visual information.

* * * * *